United States Patent [19]

Lubow et al.

[11] Patent Number: 5,835,615

[45] Date of Patent: Nov. 10, 1998

[54] BAR CODE PRINTABILITY GAUGE

[75] Inventors: Allen Lubow, Brooklyn; Xinying Gu, Middle Village, both of N.Y.

[73] Assignee: Synex, Brooklyn, N.Y.

[21] Appl. No.: 823,072

[22] Filed: Mar. 24, 1997

[51] Int. Cl.⁶ .................................................. G06K 9/00
[52] U.S. Cl. .................... 382/112; 235/462; 235/437; 235/494; 101/401.2; 101/401.3
[58] Field of Search .................................. 382/112, 317; 235/437, 462, 463, 494; 283/98; 101/484, 401.2, 401.3

[56] References Cited

U.S. PATENT DOCUMENTS

| | | | |
|---|---|---|---|
| 3,393,618 | 7/1968 | Baker | 101/401 |
| 4,182,465 | 1/1980 | Dobras | 235/494 |
| 5,123,352 | 6/1992 | Luttrell | 235/463 |
| 5,327,510 | 7/1994 | Morikawa et al. | 235/437 |
| 5,503,483 | 4/1996 | Petteruti et al. | 400/88 |
| 5,507,527 | 4/1996 | Tomioka et al. | 283/93 |
| 5,687,258 | 11/1997 | Kaplan | 382/268 |

FOREIGN PATENT DOCUMENTS 63-244290  10/1988  Japan ...................... 235/494

*Primary Examiner*—Jon Chang
*Assistant Examiner*—Jingge Wu
*Attorney, Agent, or Firm*—Michael Ebert

[57] ABSTRACT

A printability gauge which make it possible for an observer by visual inspection of the gauge to determine the degree to which the dimensions of a printed bar code symbol deviate from the dimensions of an ideal bar code symbol defined by bars and spaces whose dimensions are derived from a unit bar of predetermined thickness. The gauge includes a checkerboard pattern whose black and white squares are all of the same size only when the thickness of the unit bar in the printed symbol matches that of the ideal symbol whereby the checkerboard pattern then appears to the observer to be 50 percent gray. Should the unit bar in the printed symbol, as a result of a processing error, be thicker than in the ideal symbol, then the size of the black squares will be correspondingly enlarged at the expense of the white squares, and the checkerboard pattern will then appear to be more than 50 percent gray. But should the unit bar in the printed symbol be thinner than in the ideal symbol, then the size of the white squares will be enlarged at the expense of the black squares and the checkerboard pattern will appear to be less than 50 percent gray.

12 Claims, 3 Drawing Sheets

BAR CODE PRINTABILITY GAUGE

BACKGROUND OF INVENTION

1. Field of Invention

This invention relates generally to the production of bar code symbols, and more particularly to a bar code printability gauge which makes it possible for an observer by visual inspection of the gauge to determine the degree to which the dimensions of a printed bar code symbol deviate from the symbol printing specifications.

2. Status of Prior Art

A bar code is the most widely used technique for creating machine-readable data on labels and packaging, and for other applicatios. In the United States, bar codes now appear on virtually every piece of store-bought merchandise, as well as on computer generated forms, shipping containers and mail. And one often sees pharmaceuticals carrying two or three bar code symbols. All books and periodicals, redemption coupons, cash register receipts, and trademark office documents makes use of bar-coded identification numbers.

The use of bar code symbols to identify food and other products sold in supermarkets and other retail establishments has gained broad acceptance. A code, known as the Universal Product Code (UPC), provides for the encoding of 12 numeric characters, including a check character. Each character in the code consists of two dark bars and two light bars. A light bar is defined by the space between adjacent dark bars. Each individual character is encoded in a region consisting of seven rectilinear areas, called modules. Both bars and spaces consist of one to four modules. In addition, two one-module dark bars and their intervening spaces on each end of the symbol and in the middle provide delimiters.

The overall UPC symbol has the appearance of thirty dark bars of varying width, separated by light bars. The encoded characters are also printed along the bottom edge of the symbol to provide for human readibility. For decoding, the symbol is scanned optically in an X-shaped pattern and the resulting binary signals are processed to identify the particular characters. This however is not the only way by which a bar code symbol can be decoded.

Misprinted bar code symbols which are rendered unreadable because of dimensional inaccuracies are costly to companies which produce and handle code labelled products, for each year these companies suffer considerable losses due to unreadable labels. When a bar code symbol printed on a product label cannot be read by a bar code scanner, then other means must be found to enter the data carried by the symbol into the system. The resultant down time is both frustrating and expensive to the operator of the system. Moreover, in military and medical applications, bar code readability errors may create life-threatening situations because of the unavailability of the data carried by the symbols.

The detection of dimensional errors in a bar code symbol simply by visual inspection has heretofore not been possible even by bar code experts. And it is because of such errors that bar code symbols printed on products, despite great care exercised in the course of processing, are not in all cases machine readable. The only means heretofore available by which could check the dimensional accuracy of a bar code symbol is by electronic instruments known as verifiers. But as will now be explained, such verifiers do not assure dimensional accuracy of the printed bar code symbol as it appears on the product.

Information encoded in a bar code symbol is expressed by the relative widths of the symbol's dark bars and spaces or light bars. The readability of a symbol therefore depends on the ability of a scanner to measure these relative widths. Determining the relative widths of bars and spaces may depend on increments as small as $\frac{1}{10,000}$th of an inch.

Thus bar code symbols are presently checked for accuracy with electronic verifiers adapted to measure the characteristics of the bar code symbol against known standards. This insures that the bar code has the greatest chance of being read properly by a wide variety of readers and scanners. A conventional verifier uses a scanner of an established aperture, typically 6 mil. When symbols use finer bars and spaces, a 6 mil aperture may not yield accurate verification reports.

Bar-coded labels and packaging are currently created using computers and software for this purpose. As electronic documents with graphics travel through a print production process, changes take place causing the images to be altered in unexpected ways. In many instances this is of no consequence, for when typed text or graphics are printed too thick or too thin their readability is unaffected thereby. Thus a blue sky, still looks like blue sky and Helvetica Medium 12pt. still looks like Helvetica Medium 12pt. However, changes in the thickness of the bars of a bar code symbol may render the symbol unreadable.

Bar code symbols are produced with software using published algorithms that dictate the patterns of the bars and spaces required to encode the data. The software automatically computes check digits, and starts and stops characters as well as a host of other characteristics to create these patterns. The software then converts these patterns into graphic formats required by the system or printer. These are straightforward operations which are performed repeatedly without error throughout programming.

One of the more serious bar code printing problems is caused by the physical properties of ink on paper. Due to the viscosity of ink and the porosity of paper, images tend to more or less spread, this being called print gain. Print gain results in bars being printed thicker than they should with the intervening spaces becoming thinner, thereby distorting the dimensions of the symbol to an extent that may impair its readability by a scanner.

Print gain may cause enormous dimensional changes; sometimes doubling the width of printed bars. For example, a very thin ink on a nonporous, glossy substrate may cause print gains of 50% to 100%. To overcome the problem of print gain, bar code designers use a technique called bar width reduction in which bars are narrowed in anticipation of an expected print gain.

Print gain may occur repeatedly throughout the production process. Any device that causes an image to gain thickness or density may contribute to print gain, including image setters, typesetters, scanning and photographic processes, plate production and prepress operations. The press run itself may contribute the most to print gain. These different processes may counteract each other, for the effects of one process may be negated by another. Or the result might be cumulative, adding one process's print gain upon another's.

During printing, a damaged pin or dot will leave an unprinted area (white line) running through the printed image. If this unprinted area runs through an area intended to be a bar, it is misinterpreted as a wider-than-normal space, thereby confusing the scanner and possibly rendering the symbol unreadable.

When a device, such as a printer, cannot faithfully reproduce the dimensions of a bar code because it uses a resolution other than the one used to create the bar code, then one is faced with interpolation problems. In outputting an electronic graphic file, a printer seeks to change all dimensions of the image into printer dot dimensions. Printers can only print in whole printer dots, a printer dot being the smallest unit the printer is capable of printing. Should the electronic document use dimensions that are not equal to multiples of printer dots, then the image is interpolated as the printer attempts to reproduce the dimensions as accurately as it can.

Hence the printer images the electronic file as closely as possible, rounding up or down to the nearest whole dot. On 300 dpi printers, the changes are considerable. For example, consider printing a bar code with a narrow bar dimension of 0.0115 inches. The nearest possible bar width would be 3 dots (0.01 inches) or 4 dots (0.01333 inches). If a bar dimension were set at 0.0115 inches, the printer would round down to 0.01 (a decrease of 9%) or round up to 0.013 inches (an increase of 9%). This is a considerable and damaging change for a bar code.

Another problem is that of scaling in which a bar code's width is changed to printer-supported sizes. To understand why scaling creates problems, one must understand the concept of wide/narrow ratios. Symbologies that have only two thicknesses of bars and spaces set a value for thick bars and spaces in comparison to thin ones called the wide/narrow ratio. A wide/narrow ratio of 2:1 indicates that a wide bar is twice the width of a thin bar.

If a printer printed with a dot size of $\frac{1}{12}$th inch wide, six dots are required to print a half-inch image, and 12 dots to produce a one inch image. The image therefore requires a multiple of six dots, no matter how wide it is printed. If the bar code were required to be printed at ¾ inches wide, the wide/narrow ratio would suffer because the printer could not print this pattern with ¾ inches and maintain the same wide/narrow ratio. The thin bar could not be printed 1½ printer dots wide, as this printer can only print whole dots.

Hence there are several factors, such as print gain, interpolation and scaling, that come into play in bar code printing, each factor contributing to bar code symbols being printed inaccurately; even to the degree where the symbol is no longer machine readable.

For each bar code symbology there are published specifications to which all users must conform. ANSI standards are widely regarded as the accepted standard for each symbology. Bar code systems are issued with the understanding that all participants must conform to published standards. To measure how close a bar code symbol comes to meeting these standards, electronic instruments called verifiers are used.

A verifier measures several different aspects of a bar code symbol; the most common being dimensionality. Verifiers also measure print contrast, wide/narrow ratios, absolute sizes, relative sizes, bar/space defects, reflectance and encodation algorithms.

Currently in the United States, verifiers range in price from $1,000 to $12,000. The most popular of the high-end models is the AutoScan II from RJS which retails for about $12,000. At the other end of the spectrum is the PSC Quick-Check series of verification equipment which start at around $1,000. Neither the graphic designer, the client nor the print shop is anxious to incur the expenses of a bar code verifier. But large organizations are more likely to own and use verifiers. However, the vast majority of bar code symbols produced today go unverified, for verifiers are not easy to use.

Designed to operate more like laboratory testing equipment than as a consumer electronic device, verifiers are difficult for non-technical personnel to operate. Moreover, the information yielded by verifiers is difficult to interpret. What these numbers mean to the operator, even those with experience, and how they can be used to effect changes in the printed bar codes is beyond the expertise of even the most experienced bar code professionals. And how the information is presented differs from verifier to verifier.

The most significant drawback of verifiers is that they are not used in all stages in the production of a bar code symbol. A typical production cycle might take the graphics from the office of the graphic designer to a service bureau and on to a client or printer. Ideally, one should verify the bar code symbol during each stage of production to ensure that it remain readable, bearing in mind that each successive generation may introduce errors and change the bar code images. This would require each participant in the process (the graphic designer, the service bureau, the print shop graphics department and the print shop production department) to have and use a verifier. Since each verifier cost thousands of dollars, this simply does not take place.

Verification carried out on film negatives, or earlier still, at the proofing stage, may catch some errors, while other errors which may be introduced after this point, go undetected. There is no one time in the production process when verification could be done that would preclude the need for verification at other times. To catch an error in the bar code symbol at the end of a production cycle may delay production considerably and can be enormously expensive. Yet this is not an uncommon experience.

Of prior art interest is the 1992 Luttrell patent U.S. Pat. No. 5,123,352 "Bar Code Printing Plate Method." This patent points out that bar code symbols printed on corrugated board package material are often blurred because the ink bleeds to expand the code bars. Hence these blurred printed bar code symbols are dimensionally inaccurate and may not be machine readable.

To overcome this drawback, the flexible rubber printing plate for printing the bar code includes a guide or gauge bar presenting continuous or regularly-spaced cavities resulting in a series of tiny tint relief stems receptive to ink. A tinting image is thereby printed by these stems concurrently with the bar code. The printer can visually inspect this image as an indicator of the amount of ink offset. However, this tint gauge is useful only at the final printing stage of a bar code symbol production.

SUMMARY OF INVENTION

In view of the foregoing, the main object of this invention is to provide a bar code printability gauge which makes it possible for an ordinary observer who is not a bar code expert to determine simply by visual inspection of the gauge, the degree to which the dimensions of a printed bar code symbol deviate from those of an ideal bar code symbol.

A significant advantage of the invention is that the printability gauge is useable at all stages in the production of a bar code symbol to verify during each such stage that the bar code symbol remains readable. Hence when at an intermediate stage, the gauge detects an unreadable bar code symbol, corrections can be then made before proceeding with the next stage of production, thereby avoiding the expenses which are incurred when an error is detected near the end of the bar code production cycle.

More particularly, an object of this invention is to provide a printability gauge of the above type in which the degree to which the dimensions of a printed bar code symbol deviate from those of an ideal symbol are expressed in color gray percentages whereby the readability of the printed symbol is indicated on a gray scale.

While a printability gauge in accordance with the invention is useable to verify the accuracy of printed bar code symbols defined by bars and spaces whose dimensions are derived from a unit bar of predetermined thickness, the gauge is also useable with bar code symbols that are not based on a unit bar. And the gauge is also useable with any form of digital graphics based on consistent units the gauge indicating whether the graphics are properly printed.

Briefly stated, these objects are attained by a printability gauge which make it possible for an observer by visual inspection of the gauge to determine the degree to which the dimensions of a printed bar code symbol deviate from the dimensions of an ideal bar code symbol defined by bars and spaces whose dimensions are derived from a unit bar of predetermined thickness.

The gauge includes a checkerboard pattern whose black and white squares are all of the same size only when the thickness of the unit bar in the printed symbol matches that of the ideal symbol whereby the checkerboard pattern then appears to the observer to be 50 percent gray. Should the unit bar in the printed symbol as a result of a processing error be thicker than in the ideal symbol, then the size of the black square will be correspondingly enlarged at the expense of the white squares, and the checkerboard pattern will then appear to be more than 50 percent gray. But should the unit bar in the printed symbol be thinner than in the ideal symbol, then the size of the white squares will be enlarged at the expense of the black squares and the checkerboard pattern will appear to be less than 50 percent gray. Overlying to the checkerboard pattern is a calibrated gray scale of progressively darker tones of gray. By matching the grayness of the checkerboard pattern with a point on the gray scale, the observer is then informed as to the degree to which the dimensions of printed bar code symbol deviate in either direction from those of the ideal symbol, thereby indicating the degree of readability of the printed symbol.

BRIEF DESCRIPTION OF DRAWING

For a better understanding of the invention, as well as further features thereof, reference is made to the detailed description thereof to be read in connection with the annexed drawings wherein.

DESCRIPTION OF INVENTION

UPC Bar Code Symbol

Figure 1:
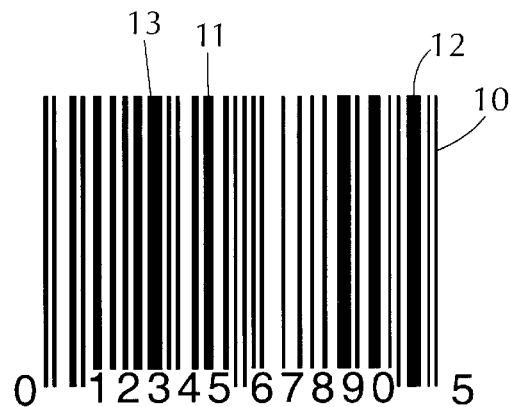
FIG. 1 shows a typical UPC bar code symbol.

The most common bar symbology in the U.S. and Canada is the Universal Product Code (UPC-A). As shown in FIG. 1 this symbol includes in its pattern of bars and spaces, a unit bar 10. Unit bar 10 is a narrow bar having a predetermined width for a bar code symbol at a given magnification. The dimensions of the bars and spaces in the symbol are exact multiples of the unit bar.

Figure 2:
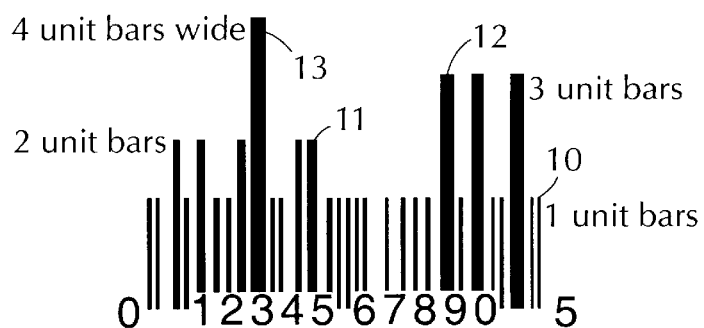
FIG. 2 shows the same symbol in which the height of each bar depends on its thickness, thereby illustrating this distinction.

Thus bar 11 in the symbol is twice as wide as unit bar 10, while bar 12 is three times as wide and bar 13 is four times as wide. To illustrate these distinctions in FIG. 2, the height of the bars are shown based on their thickness. Thus bar 13 whose thickness is four times greater than unit bar 10 is the tallest.

Each bar code symbol begins and ends with start and stop characters referred to as frame bars that are unique to the symbology involved and tell the scanner what symbology to expect when reading the symbol. The frame bars in the symbol shown in FIG. 1 are composed of unit bars.

A bar code symbology is a set of encoding algorithms providing the grammar for the production of a bar code pattern. As in languages, bar code symbologies have rules of grammar that dictate how the pattern of bars and spaces are formed for any particular coded data.

In an ideal UPC symbol, the unit bar has a predetermined thickness and all other bars and the spaces therebetween have thicknesses that are exact multiples of the unit bar thickness. If therefore when this UPC symbol is printed, and it is found that the printed unit bar is thicker or thinner than the thickness of the unit bar in the ideal symbol, then the dimensions of the bars and spaces which make up the symbol correspondingly deviate from those of the ideal symbol. While some degree of deviation is tolerable, a greater degree of deviation in the printed symbol may render it machine unreadable.

A bar code printability gauge in accordance with the invention acts to gauge a printed bar code symbol to determine whether its unit bar is thicker or thinner than the corresponding unit bar in the ideal symbol, for if a deviation exists, then the dimensions of the bars and spaces of the printed symbol do not match those in the ideal symbol and the printed symbol may be unreadable. To be readable, a printed symbol need not perfectly match the ideal symbol. But the dimensional inaccuracy must be within the tolerances of the bar code reader.

Pre-Production of Bar Code Symbols

In creating bar code symbols, the production techniques for this purpose fall generally into two classes, an integrated software-hardware system and a non-integrated system.

A typical integrated system for printing bar coded labels is a dedicated computer associated with a printer. When a bar code is generated, the output device and its resolution expressed in dpi (dots per inch) have already been defined in the software. The bar codes are adjusted to accommodate anticipated changes. An integrated system may be equipped with verifiers to check each and every bar code symbol that is produced. Since printing is fixed and uniform, errors are usually limited to defective media and ribbons, or faulty printheads.

Figure 3:
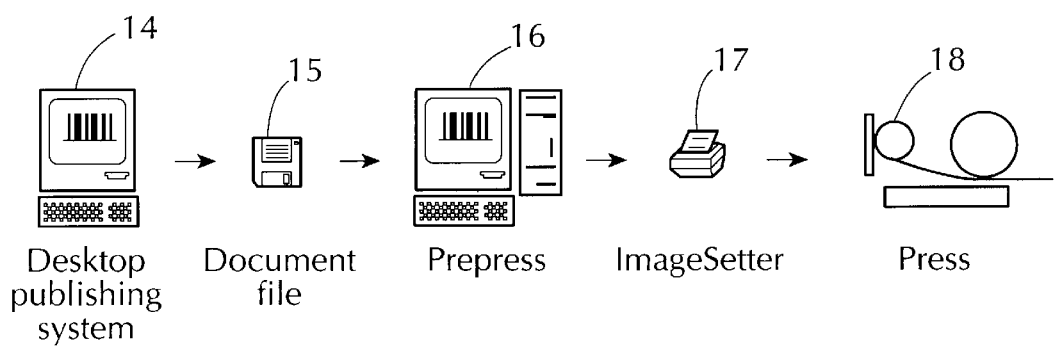
FIG. 3 shows the stages of a non-integrated system for producing a bar code symbol.

In the case of a non-integrated system, as shown in FIG. 3, the software generating the bar code is not informed about the output device to be used, nor how the graphics will be printed. Thus a non-integrated system involves several steps and transformations and includes at its first stage a desk top publishing system 14 whose output is fed into a document file 15. The bar code symbol is initially created as an electronic graphic file.

An example of a software application that allows a user to create bar code symbol is BAR CODE PRO, marketed by SYNEX of Brooklyn, N.Y. This software provides a bar code which uses whole numbers of printer dots to size the bar codes. And the user can adjust the dimensionality of the bar code for any anticipated print gain. Document file 15 goes to a pre-press operation 16, and from there to an image setter 17 and finally to a press 18. The press operators do not know how the graphics are created.

Figure 4:
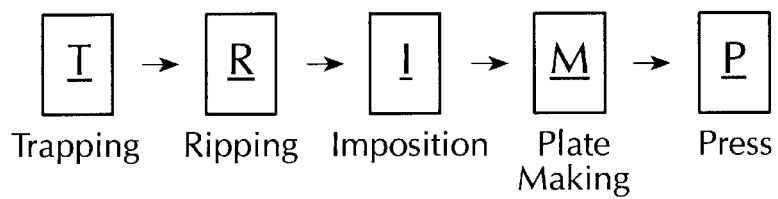
FIG. 4 shows the transformation of an electronic document on its way to a press.

For any given dpi, BAR CODE PRO computes accurate whole dot settings for the bar code symbol width magnification and the dimensions of the unit bar. With this software, the initial image can be designed for any dpi device. The symbol is placed as a graphic in an electronic document which then undergoes several transformations. As shown in FIG. 4, these transformations involve trapping T, ripping R, imposition I, plate making M and press P. The resulting file is conveyed to a high resolution output device for the creation of film negatives or positives to be used in the production of printing plates. The nature of the printing plates depends on the particular printing method used—such as, offset, lithography, flexography or gravure printing.

Any one of these techniques may affect the dimensions of the bar code symbol and its accuracy and thereby impair its usefulness. Because non-integrated systems are prone to bar code dimensionality errors in all stages of the system, the ability to gauge the accuracy of the bar dimensions in each of these stages is of great value, for when an error if found, it can then be corrected.

The Printability Gauge

Figure 5:
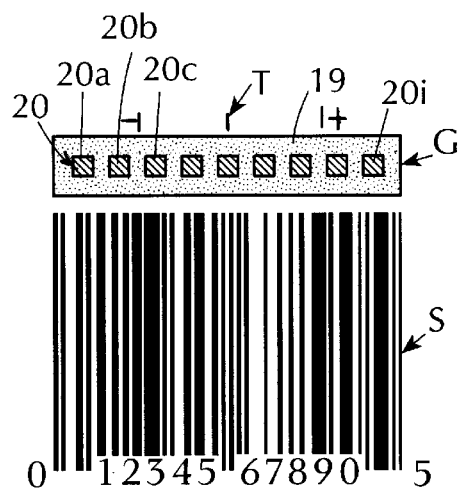
FIG. 5 illustrates a bar code symbol above which is a printability gauge in accordance with the invention.

FIG. 5, illustrates a typical UPC bar code symbol S above which is a printability gauge G in accordance with the invention. Symbol S is constituted by digitally printed graphics, the gauge making it possible by visual inspection to determine how close the dimensions of the digital reproduction are to the dimensions of the original. In the context of the present invention, this original is the ideal form of the bar code symbol.

Figure 6:
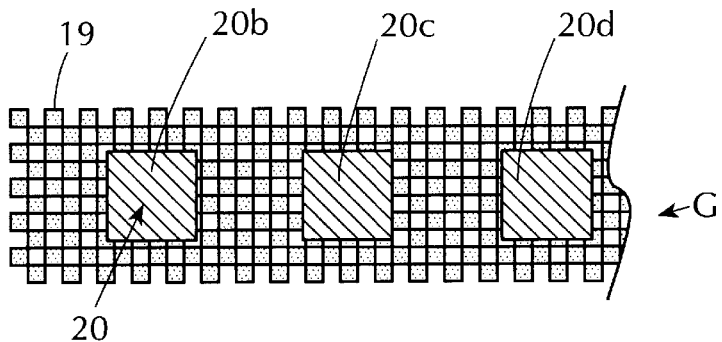
FIG. 6 is an enlargement of a portion of a gauge.

Gauge G, as best seen in FIG. 6, includes a rectangular checkerboard pattern 19 whose length matches that of symbol S, and a gray scale 20 overlying the pattern formed by a row of blocks 20a to 20i having progressively-increasing degrees of grayness. Thus first block 20a in the scale is almost white, and the final block 20i is almost black.

Each black square in checkerboard pattern 19 has the same dimensions as the unit bar in the printed bar code. As previously explained, in a UPC bar code symbol, the unit bar is the smallest module used to create the thickness of the bars and spaces of the symbol, all of which are multiples of the unit bar.

Figure 7:
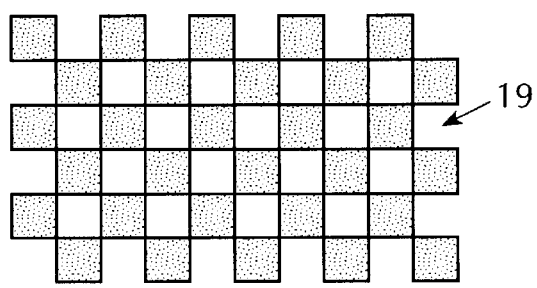
FIG. 7 illustrates the form of the checkerboard pattern included in the gauge when the related bar code symbol is printed perfectly.

When the printed bar code symbol is perfect, and therefore exactly matches the ideal symbol, then as shown in FIG. 7, all of the black and white squares have exactly the same size. As a consequence, checkerboard pattern 19 then appears to an observer to be 50 percent gray in that the aggregate amount of black in the pattern is equal to the aggregate amount of white. In the checkerboard pattern, the black and white squares are relatively small and are visually blended by the eye of the observer to create the color gray.

Figure 8:
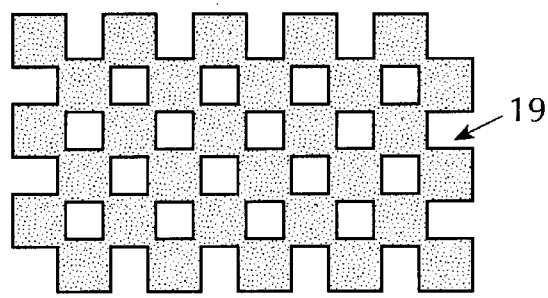
FIG. 8 shows the appearance of checkerboard the pattern when there is print gain in the printing of the symbol.

Should the unit bar in the printed symbol S be thicker than in the ideal symbol as a result of print gain, then the dimensions of the black squares will be correspondingly enlarged, as shown in FIG. 8, while the dimensions of the white squares will become reduced. As a consequence, the checkerboard pattern 19 will appear to an observer to be more than 50 percent gray. The thicker the unit bar in the printed symbol, the closer the grayness will approach a black color.

Figure 9:
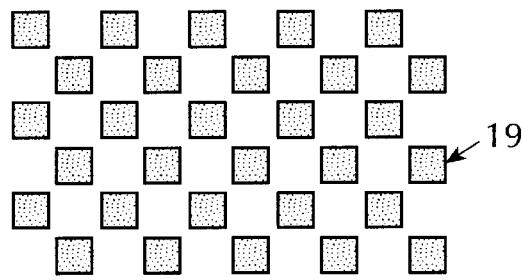
FIG. 9 shows the appearance of the checkerboard pattern resulting from a unit bar width reduction.

But should the printed unit bar be thinner than in an ideal symbol, then as shown in FIG. 9, the dimensions of the white squares in checkerboard pattern 19 will be relatively large to produce a checkerboard pattern that appears to an observer to be less than 50 percent gray.

Figure 10:
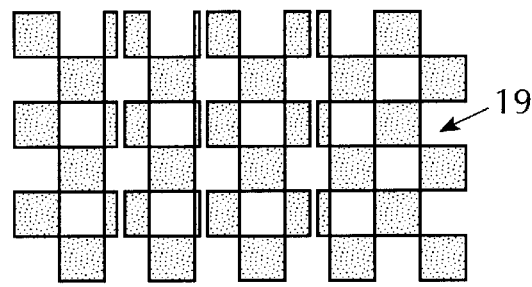
FIG. 10 shows the form of the checkerboard pattern resulting from irregular printing.
Figure 11:
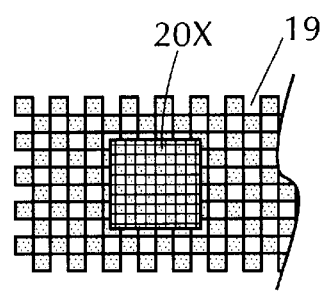
FIG. 11 shows a portion of a printability gauge in which the gray scale is formed by checkerboard blocks.

Should the printing of the bar code symbol be irregular because of damaged printer dots or print heads, then as shown in FIG. 10, white streaks will run through the checker board pattern which reduce the blackness of the black squares and result in a pattern that is less than 50 percent gray.

Gray scale 20 overlying checkerboard pattern 19 makes it possible to quantify the degree of grayness and therefore the extent to which the pattern deviates in either direction from a 50 percent-gray state reflecting a perfectly printed bar code symbol.

Above the rectangular checkerboard pattern are three equi-spaced tick marks, the middle mark T indicating the middle value on the gray scale, that is, 50 percent gray. The left and right side tick marks indicate the boundaries of acceptability. The minus sign left of the left side tick mark indicates an unacceptably thin printing, while the plus sign right of the right side tick indicates an unacceptably thick printing.

Thus an observer looking at the checkerboard pattern which is more or less gray depending on the extent of which the printed bar code symbol deviates from the ideal symbol, then relates the degree of grayness he sees to a point on the gray scale. By looking at the tick marks the observer is informed as to whether the printed symbol is acceptable or must be rejected.

The printability gauge can be read at any stage during the production cycle, for whenever the bar code symbol is printed, the gauge which is generated by software associated with the software from which the ideal bar code is generated is also printed. While there are advantages in having the gauge aligned with the bar code symbol, as shown in FIG. 5, in practice the gauge may be placed off to one side of the bar code so that it does not interfere with other printer graphics. Thus it is the practice to have color test patterns appear in the margin of a printed sheet.

Whether the bar code symbol is part of a positive, negative, stat, Xerox, Fax, blue line, color match print, desk top publishing document, or Velox, the bar code symbol dimensional accuracy can be determined by the printability gauge. Thus the printability gauge indicates unit bar reduction or growth that might have occurred as a result of errors in the printing process or in the course of transformations taking place during the production cycle.

Checkerboard pattern 19 of gauge G expresses in terms of grayness the degree to which the associated printed bar code symbol deviates from the original or ideal symbol. Checkerboard patterns in gauge G expose to an observer too-thick or too-thin printing problems. When the checkerboard pattern is above 50 percent gray, this is symptomatic of a bar code symbol that is too heavily printed, while below 50 percent gray levels are indicative of a bar code symbol that is too lightly printed. Because a calibrated gray scale is incorporated into the checkerboard pattern of the printability gauge, there is no need for an external scale.

For different purposes, the useability range of gauge G may be set to different values. Thus the gauge might be used to print precision bar code symbols to film master specifications, with a plus or minus 0.002 inches accuracy. In other cases, the range might include print gain and bar width reductions of 5 percent so that a bar code symbol might be designed in anticipation of print gain at a later stage in the production cycle.

Since gauge G is associated with bar code symbol S, and is produced in the same way as the bar code symbol, each transformation of the bar code symbol brings about a like change in the gauge. Because gauge G is always present, operators can read the gauge without additional equipment and can inspect the accuracy of a printed symbol by visual inspection even where the symbols are printed as negatives or in colors which electronic verifiers cannot see or read. Operators can be alerted to problems as soon as they occur, for the bar code printability gauge is responsive to each successive transformation during the production cycle.

Other Gauge Applications

Some bar code symbologies do not have a unit bar, such as Code 39 and Codabar. These are binary codes having a wide/narrow ratio in which the thick-thin relationship can be in fractions or decimals. It therefore becomes necessary in gauging the printability of these codes to base the gauge not on a unit bar, but on a building block which is the largest single unit from which the bar and space dimensions of the bar code pattern can be constructed.

Building block B for bars before bar width adjustment can be calculated from the following equation:

$$B = B1/M = B2/N$$

where:

B1 is the narrow bar width;

B2 is the wide bar width; and

M and N are whole numbers with the feature that for any pair of whole numbers M' and N', if $B' = B1/M' = B2/N'^2$, then $B \geq B'$.

For example, if the narrow bars of a Code 39 symbol are designed as 0.72 points and the ratio is 2.5, B should then be 0.36 since:

$$0.36 = 0.72/2 = (0.72 \times 2.5)/5$$

It is obvious from the above that (2, 5) is the pair of whole numbers generating the biggest value from the formula.

Building blocks for spaces are dimensionally the same as those for bars. After the building block dimension is determined, bar width reduction must be applied. This is done by cutting a certain dimension from each of the building blocks and adding it to adjacent spaces. This is the same procedure as is done inside the associated bar code symbol.

Some binary bar code symbologies are discrete. In discrete symbologies the intercharacter space may have a different width from the wide and narrow element. In this case, the formula above should be modified to $$B = B1/M = B2/N = S/P$$

where B1 is the narrow bar width; B2 is the wide bar width; S is the width of the intercharacter space; and M, N and P are whole numbers with the feature that for any whole numbers $M^1$, $N^1$ and $P^1$, if $B^1 = B1/M^1 = B2/N^1 = S/P^1$, then $B >= B^1$.

For a bar code symbol to print properly and subsequently to be scanned properly, the unit bar dimension must faithfully be reproduced. Printing errors which cause the unit bar width to change, adversely affect a bar code symbol's accuracy and readability. Any changes due to printing irregularities that cause the bar code symbol to change, change the checkerboard pattern of the gauge in the same way.

The use of the printability gauge is not limited to testing the accuracy of a printed bar code, for the gauge is useable with any digital graphics composed of consistent units, such as PICT, TIFF and bimapped graphics. By visual inspection of the gauge, a user can determine whether printed graphics associated with the gauge are properly printed. The user of the gauge can see by visual inspection of the gauge, (not the printed graphics) whether or not the graphics have been faithfully reproduced in accordance with their original digital image. The printability gauge is therefore highly useful in the graphics art field.

Another practical application for a printability gauge in accordance with the invention is in the field of medical imaging where accurate reproduction of images are of primary importance in reaching a correct diagnosis of the body region that had been imaged by X-ray or CAT scan instruments. Thus any X-ray or CAT scan image that is reproduced by printing the digital file in a desk top printer could include a printability gauge to indicate to the user whether the reproduced image is underprinted or overprinted. Since the data of an X-ray film image is expressed in varying shades of gray, correct printing is vital to a correct diagnosis.

Another application for a printability gauge in accordance with the invention is in color matching. If a digital image consists of four color separations, then to reproduce this image so that the colors are correct, it is essential that each of the separations be accurately printed. As the transformations previously described take place, each of the color separations is altered. But a gauge in accordance with the invention on each of the four plates tells a user how to adjust the printing to achieve more accurate results.

Another application for the gauge is in the calibration of devices used in the printing industry, such as imagesetters, typesetters, phototypesetters, printing presses, scanners and plate making equipment. Each of these devices must faithfully reproduce a graphics image. However, each of these devices relies on its own software and hardware configurations that superimpose a predefined digital grid. The interference between this grid and the artwork's grid can be visually presented and adjusted using a printability gauge for this purpose.

In a printability gauge in accordance with the invention, the gray scale superimposed on the checkerboard pattern must be calibrated to operate with each particular set of processes through which the bar code symbol passes. Otherwise stated, the calibration of the gray scale must be changed by the very same processes that alter the symbol. Unless the gray scale has been calibrated to work under a particular set of circumstances, the results are subject to question.

Thus in the gauge the checkerboard pattern, the gray scale superposed thereon and the tick marks which calibrate the scale, as shown in FIG. 5, may be used differently at different stages in the production process. For example, during the film making stage, the bar code symbol may be purposely underprinted in anticipation of future printgain. In that case, the tick marks may be set to indicate a particular degree of underprinting. The same bar code symbol during the press run may have a second set of closer tick marks to indicate final image quality.

In the context of color printing, a printability gauge in accordance with the invention makes it possible to match colors to conform to an original specification in which a particular color is produced by the blending of four patterns of differently colored dots. The relative size of the dots in each color represents the contribution of that color to the final color perceived by a viewer. These minute color dots undergo transformations in the various stages of processing comparable to those experienced in printing bar code symbols, as previously described.

The present practice in color printing is for a printer to use densitometers to optically measure the amount of color for cyan, magenta, yellow and black on a four-color press. The densitometer is calibrated before each use to indicate what zero percent and 100 percent of the color is expected to look like before it shows how much of the color it actually "sees". It is generally agreed that the densitometer is only useful to the extent that it quantifies the results, thereby making it possible to effect quantifiable changes.

A printability gauge in accordance with the invention can be used in color printing and can be calibrated to provide quantifiable results, without however requiring any mechanisms to do so, as in a densitometer.

Thus when the gauge is used to measure color, a separate gauge is printed for each color component—cyan, magenta, yellow and black. A checkerboard pattern for each color component is produced and printed in that same color. In practice, the entire gauge may be quite thin (¼") and repeated across the width of the plate. In that way, as the print is reviewed and color flow altered for each color, it may be measured.

The unit in the checkerboard pattern for each color component should match the unit of dots per inch in the original image. Where the image is too finely printed (greater than 1270 dpi) it is useful to use a unit for the checkerboard square that is larger, say 10×10 instead of 1×1.

In practice, the printability gauge is repeated across the width of the color print so that it may be used to detect variations in ink flow across the width of the press. And again, each gauge should be calibrated for a particular set of presses and plate making equipment.

While there have been shown and described preferred embodiments of a printability gauge in accordance with the invention, it will be appreciated that many changes and modifications may be made therein without, however, departing from the essential spirit thereof.

I claim:

1. A printability gauge which makes it possible for an observer by visual inspection of the gauge to determine the degree to which the dimensions of a printed bar code symbol associated with the gauge deviates from the dimensions of an ideal bar code symbol; said gauge comprising:
   (a) a checkerboard pattern composed of black and white squares whose relative sizes depend on the following conditions:
      A. when the bar dimensions of the printed bar code symbol match those of the ideal symbol, in that case the black and white squares are of the same size and the checkerboard is then 50 percent gray;
      B. when the bar dimensions of the printed bar code symbol are thicker than those of the ideal symbol, in that case the size of the black squares is enlarged at the expense of the white squares, and the checkerboard is then more than 50 percent gray; and
      C. when the bar dimensions of the printed bar code symbol are thinner than those of the ideal symbol, in that case the size of the white squares is enlarged at the expenses of the black squares, and the checkerboard is then less than 50 percent gray whereby the grayness of the checkerboard is indicative of the dimensional accuracy of the printed symbol, and
   (b) and a gray scale associated with the checkerboard pattern for visually analyzing its grayness to quantify the degree of grayness and therefore the extent to which the pattern deviates in either direction from a 50 percent gray state reflecting a properly printed bar code symbol.

2. A gauge as set forth in claim 1, in which the ideal bar code symbol is defined by bars and spaces whose thicknesses are a multiple of a unit bar having a predetermined thickness, and the sizes of the white and black squares of the checkerboard are a function of the thickness of the unit bar in the printed symbol.

3. A gauge as set forth in claim 1, in which the checkerboard pattern lies within a rectangle whose length matches the length of the printed symbol.

4. A gauge as set forth in claim 3, in which the rectangle is parallel to the printed symbol.

5. A gauge as set forth in claim 1, in which the scale formed by progressively darker tones of gray overlying the checkerboard pattern, whereby by matching the grayness of the pattern with a point on the gray scale, an observer is then informed as to the degree to which the dimensions of the printed bar code symbol deviate in either direction from those of the ideal symbol.

6. A gauge as set forth in claim 5, in which the scale is provided with calibration indicia.

7. A gauge as set forth in claim 5, in which the scale is formed by a row of blocks, each of progressively darker tones of gray.

8. A gauge as set forth in claim 7, in which each block is formed by a miniature checkerboard whose gray tone is determined by the relative sizes of the black and white squares forming this checkerboard.

9. A printability gauge which makes it possible for an observer by visual inspection of the gauge to determine the degree to which a digitally printed graphics deviates from an ideal original graphics, said gauge comprising a checkerboard pattern composed of black and white squares whose relative sizes depend on the following conditions:
   A. the printed graphics match the ideal graphics in which case the black and white squares are of the same size and the checkerboard is then 60 percent gray;
   B. the printed graphics are darker than the ideal graphics in which case the size of the black squares is enlarged at the expense of the white squares and the checkerboard is then more than 50 percent gray;
   C. the printed graphics are lighter than the ideal graphics in which case the size of the white squares is enlarged at the expense of the black squares and the checkerboard is then less than 60 percent gray whereby the grayness of the checkerboard is indicative of the accuracy of the printed graphics; and a gray scale associated with the checkerboard pattern for visually analyzing its grayness to quantify the degree of grayness and therefore the extent to which the pattern deviates in either direction from a 50 percent gray state reflecting properly printed graphics.

10. A printed gauge as set forth in claim 1, adapted to gauge a printed Universal Product Code symbol.

11. A method for gauging the printability of a printed bar code symbol to determine whether the dimensions of the bars match the dimensions of an original bar code symbol on which it is based, the printed bar code symbol not being machine readable should its dimensions deviate to an excessive degree from those of the original, the method comprising the steps of graphically generating a checkerboard pattern composed of black and white squares whose relative sizes depend on the following conditions:

A. the bar dimensions of the printed bar code symbol match those of the original symbol, in which case the black and white squares are of the same size and the checkerboard is then 50 percent gray;

B. the bar dimensions of the printed bar code symbol are thicker than those of the original symbol, in which case the size of the black squares is enlarged at the expense of the white squares, and the checkerboard is then more than 50 percent gray; and C. the bar dimensions of the printed bar code symbol are thinner than those of the original symbol, in which case the size of the white squares is enlarged at the expenses of the black squares, and the checkerboard is then less than 50 percent gray, whereby the grayness of the checkerboard is indicative of the dimensional accuracy of the printed symbol, and matching the grayness of the checkerboard with a point on a gray scale to determine the dimensional accuracy of the printed symbol, and superposing on the checkerboard pattern a gray scale for analyzing its grayness to indicate the degree of deviations.

12. A gauge as set forth in claim 1, in which the printed bar code symbol has a unit bar of predetermined width and the dimensions of the bars and spaces in the symbols are exact multiples of the unit bar, each block square in the checkerboard pattern having the same width as the unit bar.

* * * * *